United States Patent
Evans et al.

(10) Patent No.: US 6,724,524 B1
(45) Date of Patent: Apr. 20, 2004

(54) GAIN CONTROL IN RAMAN AMPLIFIERS

(75) Inventors: Alan F. Evans, Beaver Dams, NY (US); Ashiqur Rahman, Corning, NY (US); Stuart Gray, Corning, NY (US); Pavle Gavrilovic, Allen, TX (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/641,579

(22) Filed: Aug. 18, 2000

(51) Int. Cl.$^7$ .............................................. H01S 3/30
(52) U.S. Cl. ............. 359/334; 359/341.41; 359/341.42; 359/341.44; 359/110
(58) Field of Search ............................ 359/334, 341.41, 359/341.42, 341.33, 341.44, 110, 337.1, 337.12

(56) References Cited

U.S. PATENT DOCUMENTS

| | | | | |
|---|---|---|---|---|
| 4,654,520 A | * | 3/1987 | Griffiths ................ | 250/227.14 |
| 4,767,219 A | * | 8/1988 | Bibby ......................... | 374/123 |
| 4,805,977 A | * | 2/1989 | Tamura et al. ............ | 350/96.16 |
| 4,952,057 A | * | 8/1990 | Kamikawa et al. ......... | 356/73.1 |
| 5,028,775 A | * | 7/1991 | Furukawa et al. ..... | 250/227.15 |
| 5,096,277 A | * | 3/1992 | Kleinerman ................. | 385/12 |
| 5,173,957 A | * | 12/1992 | Bergano et al. ............. | 359/124 |
| 5,374,973 A | * | 12/1994 | Maxham et al. ............ | 359/341 |
| 6,111,676 A | * | 8/2000 | Lemus et al. ................ | 359/110 |
| 6,151,160 A | * | 11/2000 | Ma et al. ..................... | 359/124 |
| 6,317,255 B1 | | 11/2001 | Fatehi et al. ............ | 359/341.44 |

FOREIGN PATENT DOCUMENTS

| | | | | |
|---|---|---|---|---|
| EP | 1 018 666 | | 7/2000 | ............. G02F/1/35 |
| JP | 61096477 A | * | 5/1986 | ............ G01R/31/08 |
| WO | WO 9816017 A2 | * | 4/1998 | .......... G01M/11/00 |
| WO | WO 00/04656 | | 1/2000 | ........... H04B/10/17 |

OTHER PUBLICATIONS

Lewis, S.A.E.;Chernikov, S.V.; Taylor, J.R. "Rayleigh Noise Suppression Using a Gain Flattening Filter in a Broadband Raman Amplifier." Mar. 7–10, 2000, Optical Fiber Communication Conference, 2000, pp. 109–111 vol. 4.*
Emori, Y.; Namiki, S.; "100nm bandwidth flat gain Raman amplifiers pumped and gained–equalized by 12–wavelength–channel WDM high power laser diodes." Feb. 21–26, 1999, Optical Fiber Communication Conference, 1999, pp. PD19/1–PD19/3.*
Horiuchi, Y.; Otani, T.; Yamamoto, S.; Akiba,S.; "In–service inter–span fault monitoring on multi–repeater transmission system." Sep. 22–25, 1997, ECOC, 23$^{rd}$ . (Conf. Publ. No.:448) pp 291–294 vol. 3.*
Shimizu et al. IEEE Transactions Photonics Technology Letters, vol. 3, No. 11, Nov. 1991.*
Gysel et al. J. of Lightwave Tech. vol. 8, No. 4, Apr. 1990.*
Philen et al. IEEE J. of Quantum Electronics. vol. QE–18, No. 10, Oct. 1982.*
Corsi et al. J of Lightwave Tech. vol. 17, No. 7, Jul. 1999.*
Sorin et al. IEEE Photonics Technology Letts. vol. 4, No. 4 Apr. 1992.*
Galtarossa et al. J. of Lightwave Technology, vol. 17, No. 10. Oct. 1999.*

* cited by examiner

*Primary Examiner*—Nelson Moskowitz
*Assistant Examiner*—Stephen Cunningham
(74) *Attorney, Agent, or Firm*—Kenta Suzue; Wilson Sonsini Goodrich & Rosati

(57) ABSTRACT

A Raman fiber amplifier includes: a transmission fiber; at least one optical pump providing optical pump power to the transmission fiber; and at least one pump power detector; at least one signal detector detecting signal power propagating through the transmission fiber. The Raman fiber amplifier also includes a controller that adjusts the pump power provided by the pump to adjust, gain, or signal power provided by this Raman fiber amplifier.

20 Claims, 6 Drawing Sheets

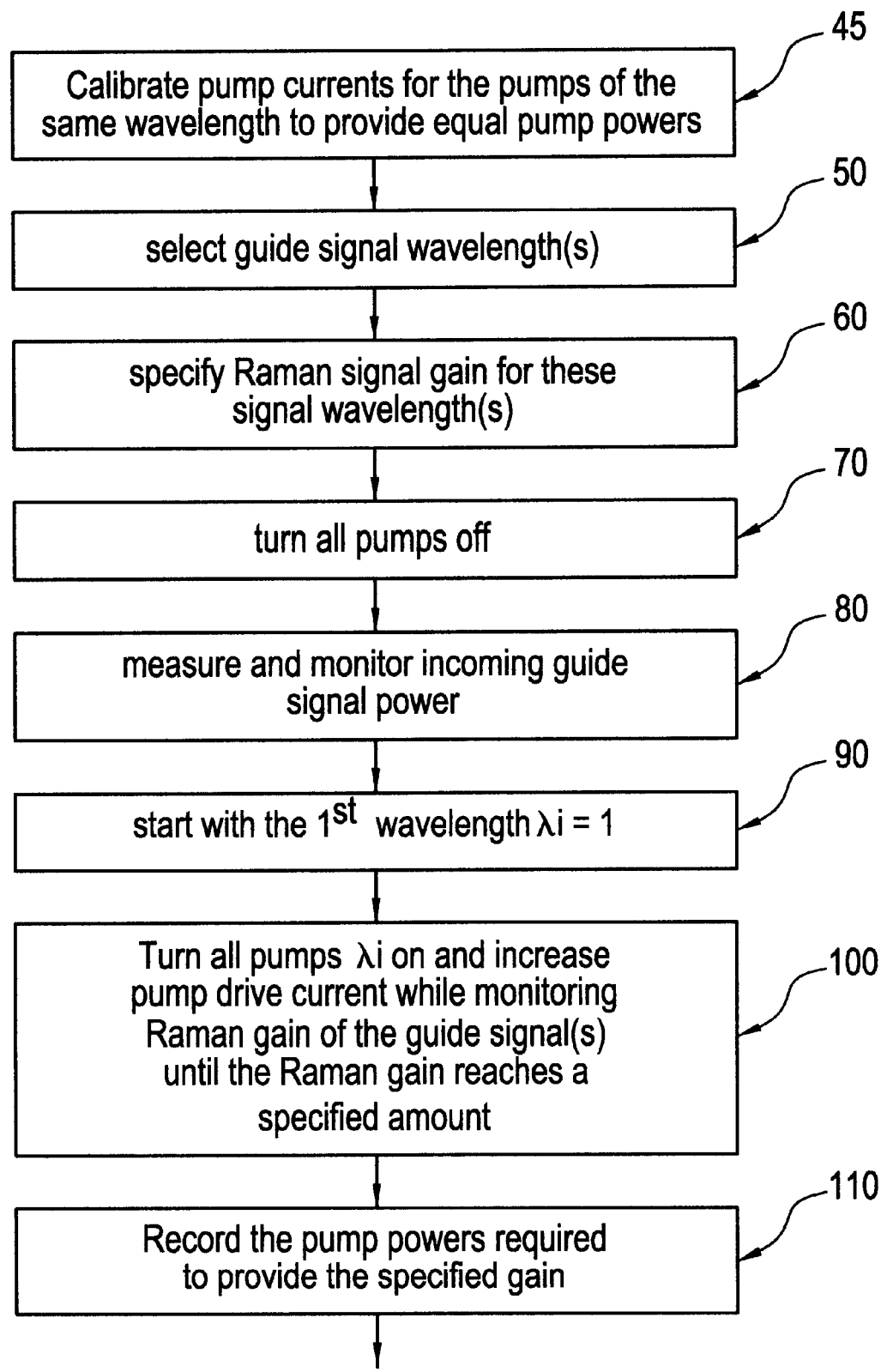

Nonoptimized Gain : 10 dB average
(Equal Pump Powers)

Minimum Gain Ripple : 10 dB average gain
(Algorithm in place)

GAIN CONTROL IN RAMAN AMPLIFIERS

FIELD OF THE INVENTION

The present invention relates to Raman amplifiers and to gain control of these amplifiers.

BACKGROUND OF THE INVENTION

A typical optical communication system utilizes a plurality of discrete amplifiers situated between long lengths (more than 5 km) of transmission fiber. The discrete amplifiers are usually Erbium doped fiber amplifiers also referred to as EDFAs. The distance between the Erbium doped fiber amplifiers is often referred to as the "span length". Typical span lengths are 25 to 100 kilometers. As the communication signal travels through the transmission fiber between two Erbium doped amplifiers, the signal attenuates and the Erbium doped amplifiers boost up the intensity of the signal.

It has been known that an optical communication system can utilize the distributed Raman fiber amplifiers in conjunction with the Erbium doped fiber amplifiers. The distributed Raman fiber amplifiers utilize transmission fiber as their gain medium. When distributed Raman fiber amplifiers are utilized in conjunction with the Erbium doped fiber amplifiers, the number of spans in an optical communication system can be increased by a factor of 2 or more. In addition, the span length between the Erbium doped amplifiers can be significantly increased. The gain performance of the Raman amplifier depends on various transmission fiber properties, such as the pump light absorption, the effective area of the fiber, and the Raman gain coefficient.

These properties of transmission fibers may vary between different fiber types and also due to the manufacturing variances within a single fiber type. Thus, given the same amount of pump power, different spans of the same length may provide different Raman gains.

The Raman gain for a small signal and a single pump wavelength is given by:

$$\text{Gain} = \exp\left[\frac{g_R}{A_{\text{eff}} \alpha_P}(1 - \exp(-\alpha_P L))P_P\right]$$

where $g_R$ is the Raman gain coefficient, $\alpha_p$ is the pump absorption, $A_{\text{eff}}$ is the effective area, L is the fiber length and $P_p$ is the pump power. Therefore, if the parameters $A_{\text{eff}}$, $\alpha_p$ or $g_R$ vary from span to span (or from fiber to fiber within the span), the Raman gain will be different. The small signal is a signal that is at least 10 times and preferably 100 times smaller than the total pump power to be provided by the pumps. It is a non-depleting signal—i.e., does not change the optical pump power distribution (along the length of the fiber).

Optical communication systems are designed to have a predetermined gain between spans of fiber. If the amount of gain provided by the distributed Raman fiber amplifier differs from the required (predetermined) gain, the signal input power into the EDFA is different from the input power that this EDFA was designed for and, the gain spectrum provided by the EDFA tilts. This problem is then further multiplied by the subsequent distributed Raman fiber amplifiers and the subsequent EDFAs.

SUMMARY OF THE INVENTION

According to one aspect of the present invention a Raman fiber amplifier includes: a transmission fiber; at least one optical pump providing optical pump power to the transmission fiber; at least one pump power detect or detecting optical pump power; at least one signal detector detecting signal power propagating through the transmission fiber. The Raman fiber amplifier also includes a controller that adjusts the pump power provided by the pump, to adjust gain or signal power provided by this Raman fiber amplifier.

According to an embodiment of the present invention, a method of controlling gain in a Raman fiber amplifier comprises at least two optical pumps supplying power in wavelength $\lambda_1$ and at least two optical pumps supplying power in at least one other wavelength $\lambda_i$, includes the steps of: (i) determining pump driving currents $C_i$ for each the optical pumps so that the amount of power provided by the same wavelength pumps is about same; (ii) determining the ratios of the pump driving currents with respect to one another; (iii) driving the optical pumps with the pump driving currents, while maintaining these ratios; (iv) determining total pump powers $P_i$ to be provided in each of the pump wavelengths; (v) adjusting the driving currents $C_i$ proportionally, with respect to one another, to provide the pump powers $P_i$.

Additional features and advantages of the invention will be set forth in the detailed description, which follows. In part it will be readily apparent to those skilled in the art from that description or recognized by practicing the invention as described herein. Including the detailed description, which follows the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF DRAWINGS

FIGS. 1A and 1B are flowcharts illustrating a procedure for gain control in distributed Raman fiber amplifiers.

FIG. 5 also shows relative difference between the maximum and minimum values on these curves, with the offset subtracted so that the average difference is centered about 0.0.

DETAILED DESCRIPTION OF THE PREFERRED EMBODIMENT

Figure 1B:
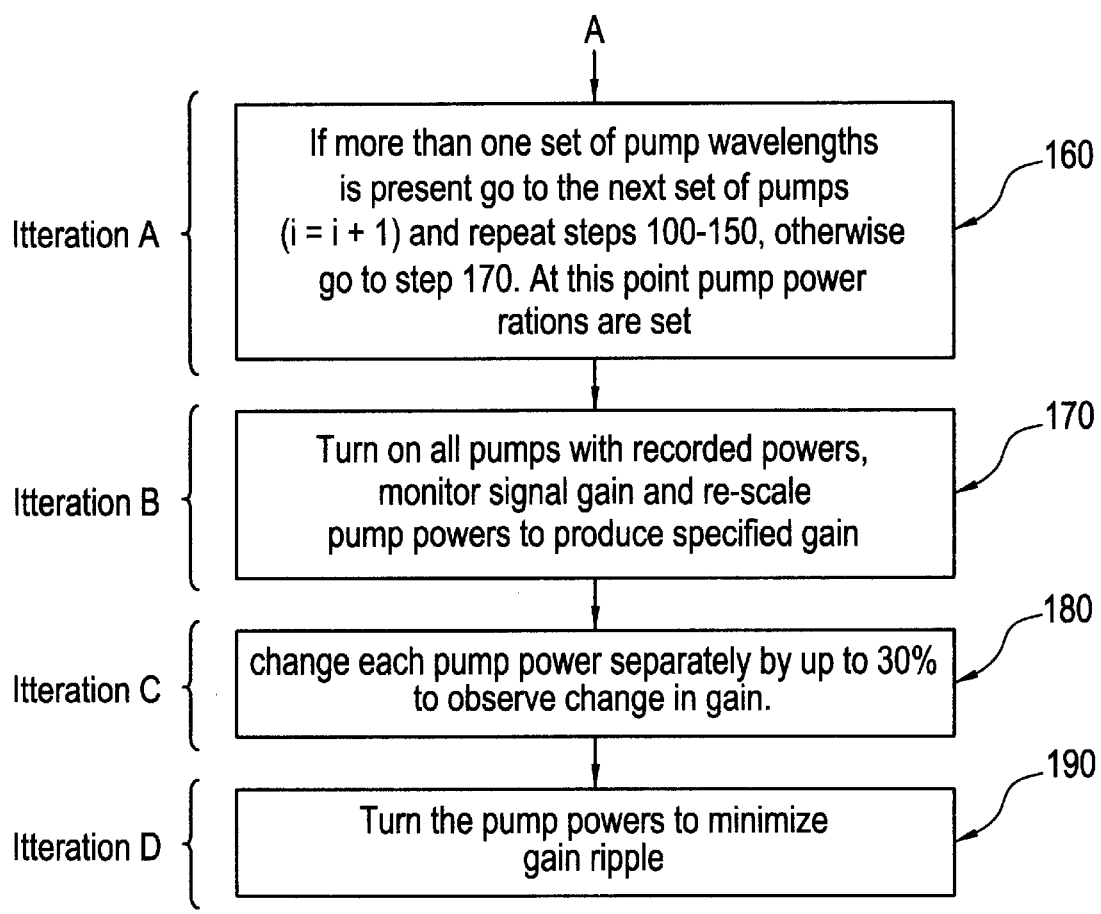

The embodiments of the present invention utilize at least one and preferably several Raman pump lasers to control Raman gain of a distributed Raman amplifier. More specifically, a unique control algorithm provides the required gain control and the feedback needed for the flexible plug and play operation of the distributed Raman amplifier. Specifically, gain control is defined as the control of gain amplitude and/or gain shape.

As stated above, gain performance of the Raman amplifier depends on the various transmission fiber properties. Therefore, due to variations in these parameters from fiber to fiber, different fibers of the same length produce different Raman gain. The improved Raman fiber amplifier of the present invention adjusts the pump power of the Raman pump lasers to compensate for the variations from fiber to fiber so that each fiber span of the transmitter system will provide the required Raman gain, even when the fiber properties vary from span to span. Preferably, the required Raman gain is the same for each span (i.e., it does not vary from span to span) because the input signal power into the subsequent EDFA (or another type of discrete amplifier) can then remain the same. According to one embodiment of the present invention the distributed Raman fiber amplifier has a controller that automatically adjusts the pump power to compensate for pump aging. Finally, the distributed Raman fiber amplifier provides a start feature that insures continuity of the optical link before potentially damaging maximum optical pump power is applied.

When the incoming signal is small (i.e. when the pump power is not notably depleted by the presence of the signal) the Raman gain is exponentially proportional to pump power $P_p$. Appropriate adjustment of pump power $P_p$ may keep the Raman gain to its desired value. In some applications, it may be preferable for the Raman gain for each span to be kept at a constant value if the span lengths in a transmission system are equal to one another. This is referred to as a constant gain mode. Alternatively, the pump power may be adjusted in order to keep the signal output power to its specified value. This is referred to as constant power mode.

The gain ripple is the variation of gain with signal wavelength. In order to broaden the gain spectrum of the distributed Raman fiber amplifier and to reduce the gain ripple, it is preferable for the Raman fiber amplifier to utilize Raman pumps that provide pump power in more than one wavelength. The wavelengths and powers of the Raman pumps in Raman fiber amplifiers are chosen to provide a specific gain shape for all of the signals. In order to maintain this specific gain shape we need to control total power at each pump wavelength individually. We achieve this individual pump power control by utilizing a procedure depicted on FIGS. 1A and 1B, which is outlined below. One implementation of this fiber characterization procedure is illustrated with reference to the distributed Raman fiber amplifier 10 shown in FIG. 2. An alternate embodiment 10' is illustrated in FIG. 3. These distributed Raman fiber amplifiers 10, 10' utilize two pump wavelengths λ1, λ2 and a total of four laser diode pumps 12A, 12A', 12B, 12B' (two pumps at each wavelength). These pumps provide optical pump power to a long length of single mode transmission fiber 13. It is noted that although the use of four optical pumps is preferred, a total of two pumps (one per each wavelength $\lambda_1$, $\lambda_2$) may also be used. It is preferred that the length of the transmission fiber 13 be greater than 5 km for long distance communications systems. It is more preferable that the length of the transmission fiber 13 be greater than 50 km. It is most preferable for this length to be greater than 80 km. The pump wavelengths $\lambda_1$, $\lambda_2$ are in a range of 1350 nm to 1510 nm. In this embodiment, the pump power of each optical pump 12A, 12A', 12B, 12B' is between 5 mw to 250 mw. The two pumps at each wavelength $\lambda_i$ provide optical powers that are polarized orthogonally with respect to one another. We have specified that when a guide signal(s) of wavelength $\lambda g_i$ enter(s) the distributed Raman fiber amplifiers 10, 10' and the two pumps in each of the two pump wavelengths (λ1 or λ2) are turned on, the distributed Raman fiber amplifier will provide Raman gain $g1_i$ and $g2_i$, respectively. In the Raman fiber amplifiers 10, 10' the launch power of the small signal into the transmission fiber 13 at each guide signal wavelength is about 0 dBm. The total optical pump power to be provided by the pumps 12A, 12A', 12B, 12B' is about 500 milliwatts. The pump signals of the same wavelength $\lambda_i$ are coupled together with polarization multiplexers 14A, 14B. Different pump wavelengths $\lambda_1$ and $\lambda_2$ are then combined by a narrow band wavelength multiplexer 16. The number of pump wavelengths can be greater then two. The pump powers, provided by the multiple pumps can be combined by a cascade of narrow bandwidth wavelength division multiplexers, or a single multi-fiber input wavelength division multiplexer.

Figure 2:
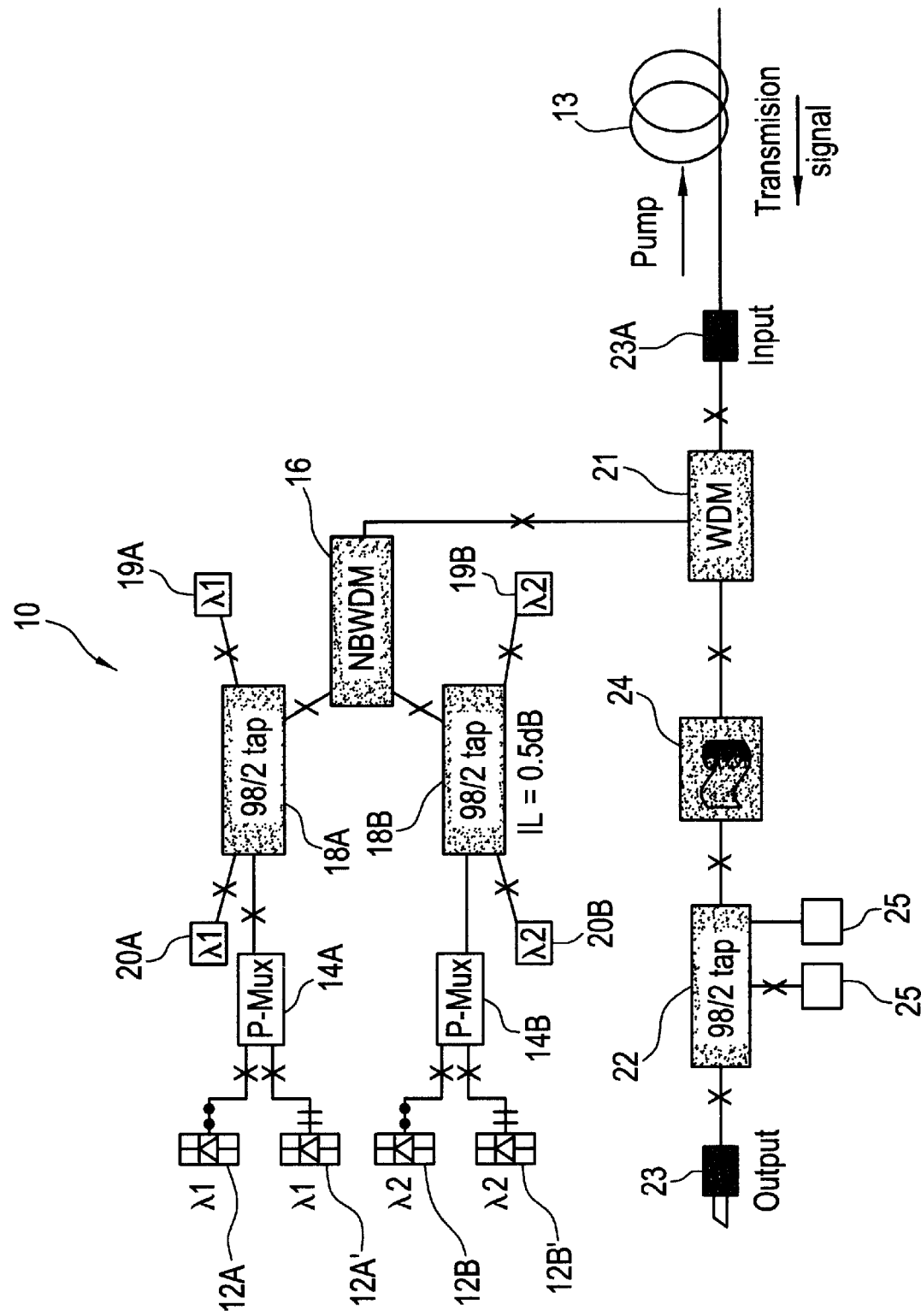
FIG. 2 illustrates schematically a first embodiment of a distributed Raman fiber amplifier of the present invention.
Figure 3:
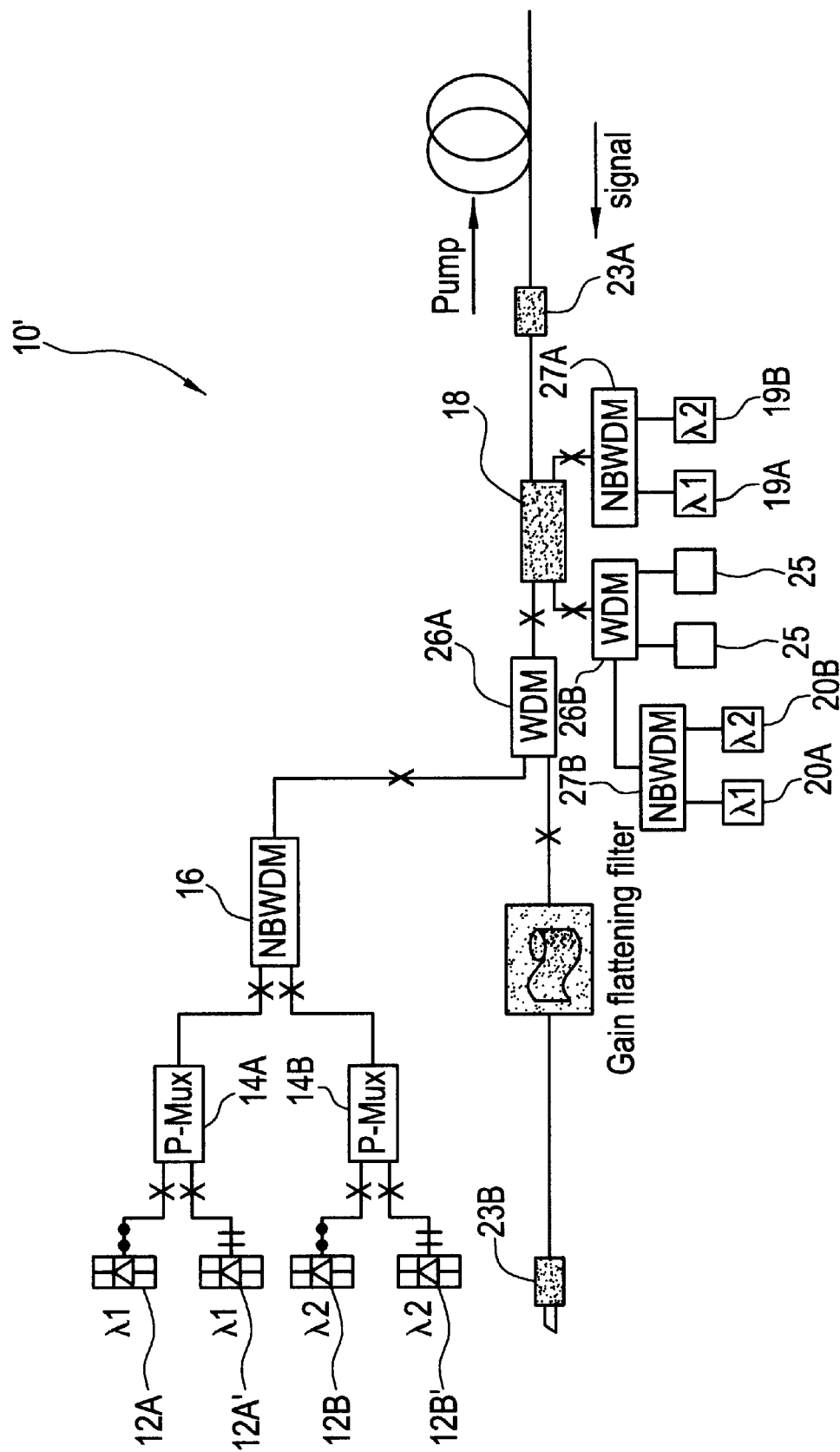
FIG. 3 illustrates schematically a second embodiment of a distributed Raman amplifier of the present invention.

In the distributed Raman amplifier 10 of FIG. 2, two 98/2% taps 18A and 18B are located in between the polarization multiplexers 14A, 14B, and the narrow band wavelength multiplexer 16, respectively, to divert a small portion of pump power for monitoring purposes. More specifically, while most of pump power is provided to a narrow bandwidth wavelength division multiplexer 16, some of the pump power is detected by pump monitors 19A (for $\lambda_1$) and 19B (for $\lambda_2$). Monitors 19A, 19B may be, for example, photodiode detectors. Any backward pump power propagating through the transmission fiber towards the pumps is provided to back scatter monitors 20A, 20B. The monitors may be, for example, Rayleigh backscatter monitors. The function of these monitors 20A, 20B is described later on the specification. A wavelength division multiplexer 21 couples the pump power (which is counter-propagating power with respect to the signal optical power) at wavelengths $\lambda_1$, $\lambda_2$ onto the transmission fiber 13. A second tap 22 is placed between the output port 23B and the optional gain flattening filter 24 to direct a small part of optical signal into a signal monitor or detector 25.

FIG. 3 is similar to FIG. 2, but the amplifier 10' utilizes a single tap 18 situated between wave division multiplexer 26 and the input port 23A. A small portion of the taped light (2%) is then diverted and split between a wavelength division multiplexer 26B and a narrow band width division multiplexer 27A, 27B to respective pump monitors 19A, 19B backscatter monitors 20A, 20B, and signal monitor(s) 25.

Referring to FIGS. 1A and 1B, we will now provide a general description of the procedure for the gain control of the Raman fiber amplifiers. A more detailed description follows further below.

First, we calibrate the pump currents and select a set of particular signal wavelengths (it could be one or many signals or an amplified spontaneous emission source) to use as guide signals for the distributed Raman amplifier. (This corresponds to steps 45 and 50 of FIG. 1A.) Second, we specify how much Raman gain (dB) the guide signal(s) will achieve when each of the Raman pumps acts alone. (This corresponds in step 60 of FIG. 1A.) Once we have this specification, then, for each span of the communication system (i.e., for each distributed Raman amplifier), we send the guide signal(s) and we monitor pump power at each pump wavelength separately. That is, the pumps of a certain wavelength are turned on, and all the pumps of all other wavelengths are turned off. More specifically, when all the pumps are turned off we monitor the signal power of the incoming guide signal(s). Then, we turn on all of the pumps of one wavelength. Once these pumps are turned on we slowly increase their driving currents Ci while ensuring that each pump produces the same amount of optical power. This is done while we observe the amount of Raman gain of the guide signal(s). (This corresponds to steps 70–100 of FIG. 1A.) Once the Raman gain of the guide signals reaches the specified gain amount, we record the pump power present in the fiber and the corresponding driving currents $C_i$ of the pumps. (This is step 110 of FIG. 1A.). Then, we turn off the pumps corresponding to this wavelength and continue setting pump powers and pump driving currents for the other pumps in the same manner. (This corresponds to step 160 of FIG. 1A.). Finally, we readjust the pump powers while monitoring the signal gains to minimize gain ripple. (This corresponds to steps 170–190 of FIGS. 1A and 1B.)

To illustrate the gain control procedure in Raman fiber amplifiers, we will refer to exemplary Raman fiber amplifiers of FIGS. 2 and 3. In order to set up the distributed Raman fiber amplifier 10, 10' to provide a predetermined amount of Raman gain, we calibrate the pumps 12A, 12A', 12B, 12B' as follows:

We turn on the pump 12A, monitor its power via the tap monitor 19A and record the current level $C_1$ to get a predetermined amount of optical pump power. Then we turn off the pump 12A and turn on pump 12A', which provides pump power of the same wavelength as that was provided by the pump 12A. We monitor its driving current $C_2$ to get the same amount of pump power that we obtained from the pump 12A. Knowing the ratio of these two driving currents ($C_1$, $C_2$) we can always drive both pumps 12A, 12A' so as to provide the same amount of pump power. We perform a similar setup for the pump 12B and pump 12B' (of wavelength $\lambda 2$) and record both driving current ratios C3, C4 that are required in order for pumps 12B, 12B' to provide equal optical pump power. If there are more than two pump wavelength $\lambda_i$ the procedure is repeated for the pumps of wavelengths $\lambda_3$, $\lambda_4$, etc. (This corresponds to step 45 of FIG. 1A.) Now, we turn off all the pumps, select a guide signal(s) $\lambda_g$ and specify Raman gain g1. Then we send a guide signal $\lambda_g$ (for example, $\lambda g=1525$ nm) and detector observe the signal power corresponding to $\lambda_g$ at the signal detector or signal monitor 25 (steps 50–80 of FIG. 1A). After this, we turn on both pumps 12A and 12A' (i.e., both of the pumps of wavelength $\lambda 1$) and slowly increase their driving currents $C_1$, $C_2$ (by keeping the current ratio constant so as to provide the same amount of power by these pumps), and monitor the signal gain. When the signal gain reaches a predetermined value g1, we record the pump currents ($C_1$ and $C_2$ for the pump 12A and the pump 12A', respectively). (This corresponds to steps 90–110 of FIG. 1A). If the signal gain does not reach g1 after driving with maximum allowed currents; we may consider replacing these pumps with those that can provide higher pump power. Next, we turn off the pumps 12A and 12A' and turn on the pumps 12B and 12B'. After this, we slowly increase their driving currents (by keeping their current ratio constant). When the guide signal gain reaches the predetermined value g2, we record the driving currents ($C_3$ and $C_4$ for the pump 12B and pump 12B', respectively). In order to operate all the pumps together, such that we can obtain the required gain shape, we turn on pumps 12A, 12A', 12B, 12B' with the drive currents $C_1$, $C_2$, $C_3$, and $C_4$, respectively. (This corresponds to step 160 of FIG. 1B.) This ends iterations A, which establish pump power ratios for the specified signal gain.

Finally, by varying the total pump power while keeping the pump power ratios the same (i.e., by keeping the pump currents ratio $C_1$: $C_2$: $C_3$: $C_4$ same) we can get different amount of gain for the same signal configurations. We achieve this gain by monitoring the total gain, which we define by: (total signal power at the signal monitor with all pumps on)/(total signal power at the signal monitor with all pumps off) while changing the total pump power (step 170 of FIG. 1B). This ends iteration B, which determines the pump powers required to achieve a specified gain.

More specifically, a preferred embodiment for iteration C is one which utilizes more than one signal monitor, 25. Optical filters or wavelength demultiplexing components immediately in front of these monitors 25 restrict the signal wavelength bandwidth incident on each monitor. In this way, each monitor responds to a single signal or a narrow wavelength band of signals. Since the output of steps 180 and 190 of FIG. 1B is the adjustment of the power of each pump wavelength, in the preferred embodiment the number of free parameters (pump wavelengths) to tune is equal to the number of input parameters (signal monitors) so as to constrain the optimization. This level of monitoring and control is preferred because it results in tuning the pump powers to provide the desired spectral gain shape to within the designed accuracy the transmission system. A greater number of signal monitors than pump wavelengths is even more preferred. Although a flat shape is envisioned as the preferred spectral gain shape, other shapes are possible and may be desirable.

In a transmission fiber, the optical frequency peak of the Raman gain spectrum is about 13.2 Terahertz lower than the pump frequency corresponding to about 105 nm greater wavelength than a given pump wavelength. As a result, to first order the lowest signal frequency band is most strongly coupled to the lowest pump frequency i.e., there is a linear mapping between these frequency bands. This is true for each respective signal band and pump frequency up to the highest signal band and highest pump frequency. Because of this frequency mapping, it is preferred that not only the number of signal monitors 25 of FIGS. 2 and 3 be equal to the number of pump frequencies, but also that their optical frequency be centered via optical filters or wavelength demultiplexing components at about 13.2 Terahertz lower than the pump optical frequency. More specifically, the lowest signal frequency band should be preferably about 13.2 Terahertz lower than the lowest frequency pump. The next lowest signal frequency band should be preferably about 13.2 Terahertz lower than the next lowest frequency pump, etc., on up to the highest signal frequency band and the highest frequency pump.

The following gives more details on the preferred method of iteration C.

An electronic error voltage or current is generated by the monitor(s) 25 if the gain measured by any of the signal detectors is higher or lower than the design value. The voltage or current is used to readjust the pump optical power. Yet, pump to pump and signal to signal power transfer will keep this mapping from being completely linear, i.e., adjustment of any pump will in fact change the entire signal spectrum. However, this procedure will still work by continuing to assume linear mapping but iterating several times to achieve convergence. In other words, after the first feedback loop to the pump power of the electrical error response, the resulting signal spectrum will be flatter (or any other spectral shape desired). Subsequent feedback loops will continue to improve the spectral shape until it matches the desired shape to within the designed accuracy. (This corresponds the steps 180 and 190 of FIG. 1B.)

Figure 6A:
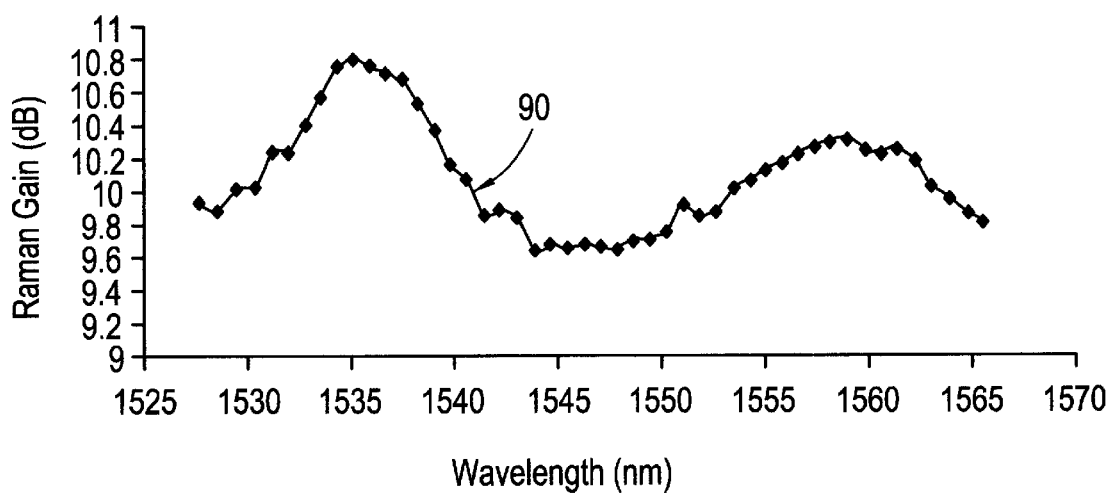
FIG. 6A illustrates Raman gain spectrum of the Raman fiber amplifier of FIG. 2, upon completion of step 170 of the gain control procedure.
Figure 6B:
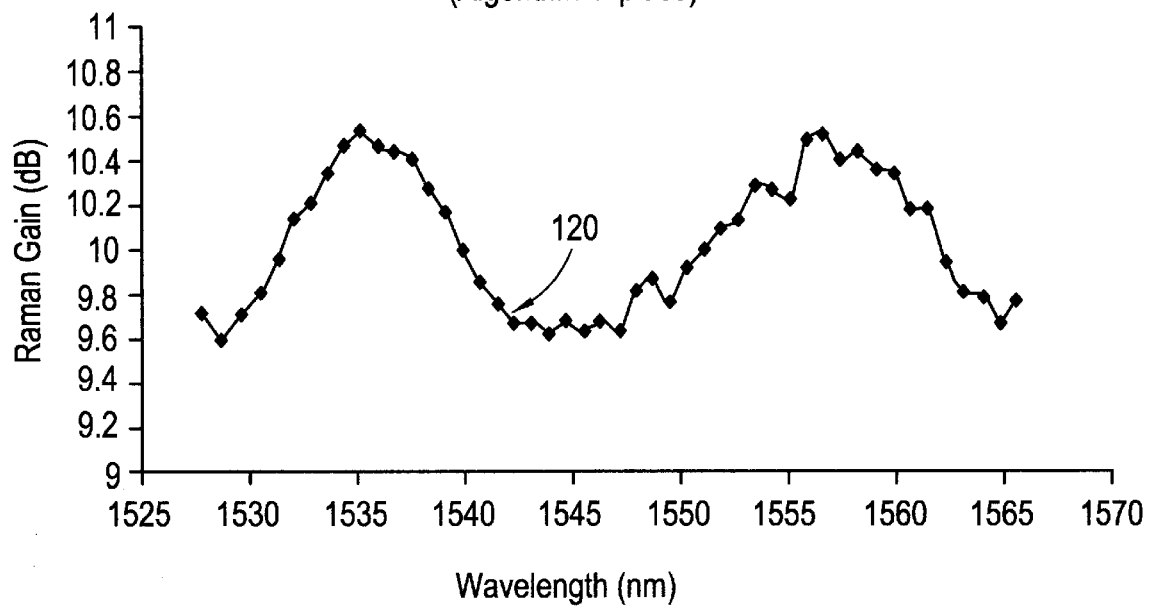
FIG. 6B illustrates Raman gain spectrum of the Raman fiber amplifier upon completion of step 180 of the gain control procedure.

An example of this is illustrated for two pump wavelengths with the help of FIGS. 6A and 6B. In this example, the signal spectrum is split into two bands. A proper choice of where the bands are split results in equal optical power on the two signal detectors when a flat spectrum is desired. With reference to curve 120 of FIG. 6B, this is near the middle of the wavelength band. FIG. 6A shows the average gain shape of the signals when there is equal pump power at each wavelength and the gain is 10 dB. The y-axis of FIG. 6A corresponds to Raman gain, defined as the output signal power with the pump lasers on divided by the output signal power with the pumps lasers off. The x-axis depicts wavelength in nanometers. The curve 90 shows the dependence of gain on wavelength (i.e., gain ripple). If the signal is split near the middle of the spectrum (1546 nm in this example), there clearly is more power in the lowest wavelength monitor. Once the power incident on both monitors is adjusted to be equal while maintaining a constant total gain, the gain ripple is as flat as it ideally can be for this two wavelength design. This method is a specific embodiment of iteration C and is shown in FIG. 6B. The y-axis is Raman gain, defined as the output signal power with the pump lasers on divided by the output signal power with the pumps lasers off. The x-axis is wavelength in nanometers. The curve 120 shows the dependence of gain on wavelength. The gain ripple of line 90 in FIG. 6A drops from 1.7 dB to 0.9 dB of line 120 in FIG. 6B. An increase in the number of pumps can improve the ripple further at the expense of more hardware and a more complex algorithm with more iterations required.

Figure 4:
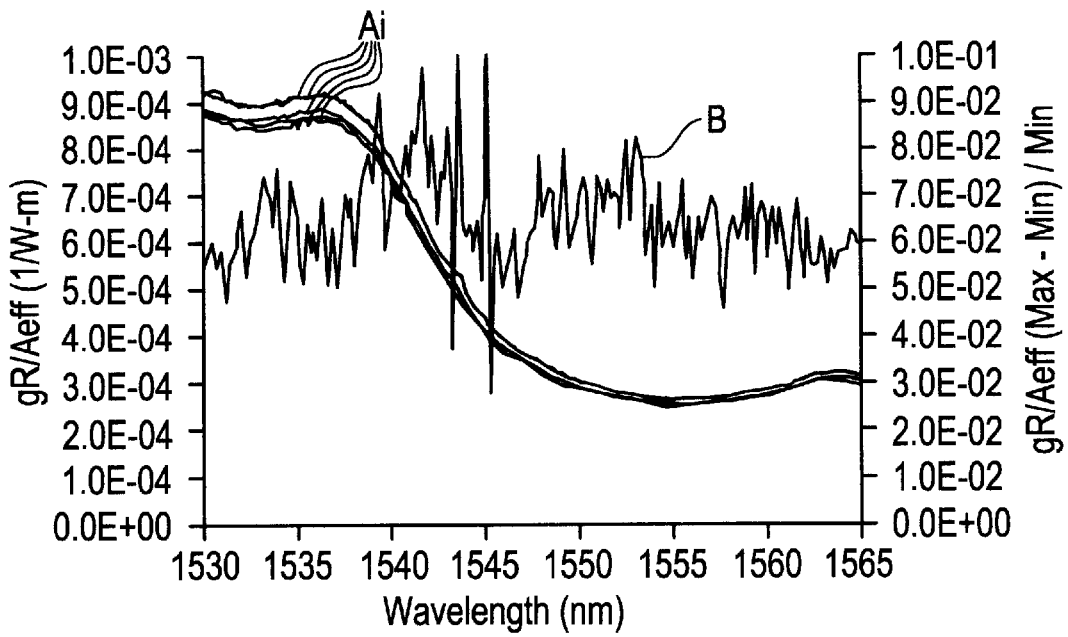
FIG. 4 illustrates Raman gain spectrum for nine exemplary transmission fibers of the same type and the relative difference between the maximum and minimum values on these curves.
Figure 5:
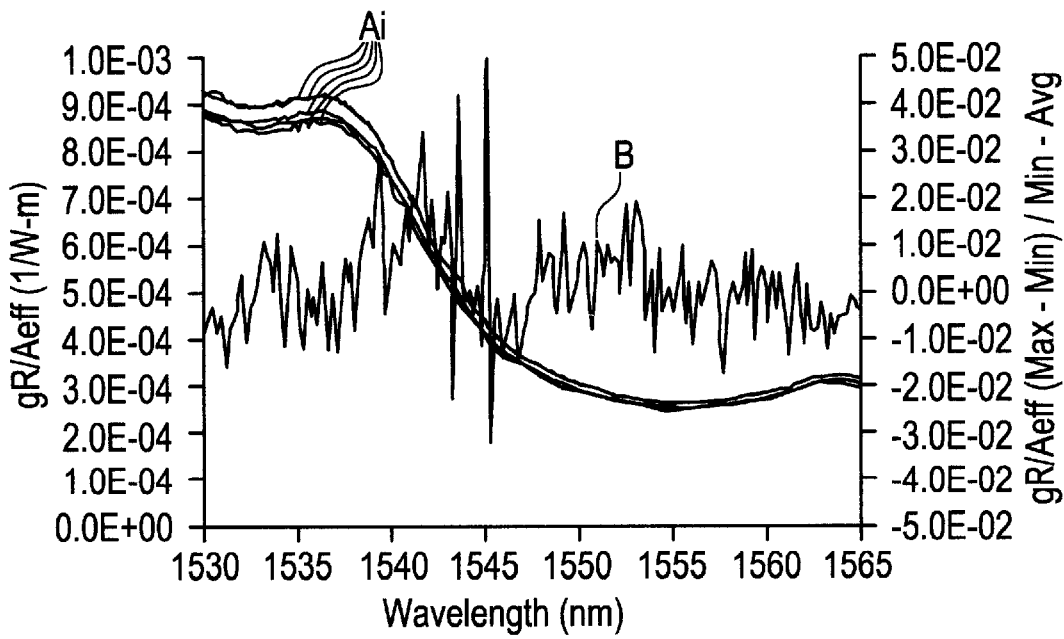
FIG. 5 illustrates Raman gain spectrum for nine exemplary transmission fibers of the same type.

The selection of the guide wavelength(s) $\lambda_{gi}$ of steps 50 (FIG. 1A) will be now be illustrated with the help of FIG. 4. It is preferred, in order to minimize gain ripple, to utilize guide signals $\lambda_g$ of different wavelengths $\lambda_i$. The left-most vertical axis of FIG. 4 corresponds to the Raman gain coefficient $g_r$ (defined as gain of signal per unit length of fiber per unit pump power) divided by effective area. The horizontal axis is wavelength. Curves $A_i$ depict the Raman gain measured for nine different fiber samples that constitute an exemplary transmission fiber utilized in the distributed Raman amplifier 10, 10'. It is noted that most of the differences in the Raman gain spectrum are due to a constant offset. It is this offset that can be taken into account by adjusting the pump power. In effect, the nine gain curves (lines $A_i$) are renormalized to cross through each other at one wavelength. That wavelength should be one that represents the average, constant DC offset. The secondary y-axis of FIG. 4 (i.e., the right y-axis) shows the relative difference between the gain spectrum, i.e., maximum difference between the fiber samples divided by the minimum gain spectrum. These differences are represented by curve B. The secondary y-axis of FIG. 5 shows this difference with the DC background subtracted.

It is important to note that the pumps will transfer energy between each other when all of the pumps are turned on. The gain values, g1 and g2, should be determined to compensate for this transfer of energy. The signals can also exchange energy through the Raman process, which result in an additional gain tilt. Because EDFAs are designed to take out gain tilt with an internal VOA it is preferable that this effect is compensated for by the EDFA.

We can control the pump aging by monitoring the pump power that comes through the pump tap. Once we have established the driving currents $C_1$, $C_2$, $C_3$, $C_4$ for the pumps, we turn on all the pumps 12A, 12A', 12B, 12B' with their respective driving currents. Then we observe and record the pump powers in the $\lambda 1$ and $\lambda 2$ pump monitors 22A, 22B, dedicated to the pump wavelength $\lambda 1$, $\lambda 2$, respectively, and treat them as control set points. We continue to monitor the pump powers in these $\lambda 1$ and $\lambda 2$ pump monitors. Suppose we observe a drop of pump power (compared to the reference power) in the $\lambda i$ pump monitor 25. (Such drops of power are normally due to pump aging). To correct for this drop of pump power we increase the pump current to increase the corresponding pump powers [i.e., drive currents $C_1$, $C_2$ for the pump 12A and the pump 12A' ($\lambda 1$ wavelength), drive currents $C_3$, $C_4$ for the pump 12B and the pump 12B' ($\lambda 2$ wavelength)] until the power in $\lambda_i$ monitors 25 reach the reference power. We can control power in each wavelength $\lambda_i$ independent of each other and thus can account for pump aging at each wavelength through an electronic feedback circuit. It is noted that each pump is likely to age independently. However, this algorithm adjusts both pumps at the monitor wavelength. Fortunately, as the pumps age, the polarization dependent gain created by gradually unbalancing the amount of powers present in the two orthogonal polarizations is negligible.

The algorithm has an added advantage in the event of a pump failure. If each pump were independently controlled, failure of one pump would not necessarily change the status of the others. With two pumps 12A, 12A', or 12B, 12B' controlled together, failure of one pump will drive the other pump up to its maximum current setting. While the design gain will not be maintained, it will be a soft failure in which the highest possible gain will be achieved.

The pump signal backscatter detectors 20A, 20B offer yet another feature which we call soft start. As stated above, in the illustrative embodiments of FIGS. 2 and 3, monitors 20A, 20B are Rayleigh backscatter monitors. Other backscatter monitors may also be utilized.

Pump backscatter is a phenomenon that causes a small amount of pump light to propagate counter to the pump direction. In this embodiment it is propagating in the optical signal direction. The backscattered pump power comprises about 0.001 of the total pump power. If the amount of this backscattered power drops below a certain level (by factor of two or more), it is indicative of a possible problem with the optical connectors, for example, due to insertion loss at the connector interface. Likewise, if the amount of backscatter is above a certain level (by a factor of 2 or more) it is also indicative of a possible problem, for example, due to a high reflection at the connector interface. If 200 mw or 500 mw of pump power impinges on such an optical connector, this optical connector is likely to be damaged. This may result in significant damage to the transmission fiber 13. The improved Raman fiber amplifier of the present invention prevents such problems.

More specifically, continuity of the optical link is assured by monitoring the signal output port. No pump power will be applied unless signal power is detected. However, it is possible to be detecting signal through dirty or poorly matched fiber connectors. As stated above, application of about 200 mw to 500 mW of pump power could damage or destroy the optical connector. To avoid this problem, a pump tap couples a small percentage of pump power that travels back from the transmission fiber towards pumps and provides the tapped pump power to a photodiode. This photodiode detects the backscattered pump power. The backscattered power is either Rayleigh scattering of the pump power recaptured by transmission fiber, or scatter due to reflections from poorly mated connectors or splices. Applying a small amount of pump power and knowing the expected power from Rayleigh scattering in the transmission fiber, it can be decided whether there are any faulty connectors or link problems before high power is applied and before the connectors are destroyed. Detected power either two times greater or two times less than the Rayleigh noise floor is assumed to come from problems in connectors or in the link.

It is further imagined that the backscatter monitor such as Rayleigh monitor could be used to detect environmentally induced changes in the fiber attenuation or change due to dropping or addition of signal channels. A change in the fiber attenuation from, for example, microbending, results in a corresponding change in the backscatter power. This signal could also be fedback to the pumps to maintain constant gain.

Finally, the signal tap will be monitored for loss of signal. In order to ensure eye safety, the immediate shutdown of the pumps will be initiated in less than 50 ms if signal loss is detected.

In conclusion, we believe that for Raman amplification to be practical, the features described herein: initial fiber characterization; feedback control for pump aging; soft start; and rapid pump shutoff will be necessary.

Accordingly, it will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed:

1. A Raman fiber amplifier comprising
   (i) a transmission fiber;
   (ii) at least one pump power detector;
   (iii) at least one pump optically coupled to said transmission fiber and to said pump power detector;
   (iv) at least one signal detector, optically coupled to said transmission fiber so as to detect signal power propagating through said transmission fiber;
   (v) a controller (a) operatively connected to said pump power detector and said signal detector, and (b) utilizing signals provided by said at least one pump power detector and said signal detector, said controller adjusting the pump power provided by said at least one pump, so as to adjust gain provided by said Raman fiber amplifier or to keep the signal power level detected by said signal detector within a predetermined range;
   (vi) further including at least one backscatter monitor measuring the amount of backscattered pump signal and providing input about the amount of measured backscatter to said controller, wherein said controller adjusts pump power of at least one pump when the amount of measured backscatter is outside a predetermined level.

2. The Raman amplifier according to claim 1, wherein said controller adjusts pump power provided by said at least one pump to maintain constant signal gain level provided by said Raman amplifier.

3. The Raman fiber amplifier according to claim 2, further including at least one gain flattening filter.

4. The Raman amplifier according to claim 1 wherein said controller adjusts the pump power provided by said at least one pump to maintain a constant output signal level provided by said Raman amplifier.

5. The Raman fiber amplifier according to claim 1, further comprising at least one pump power tap, said power tap supplying optical power to said pump power detector and at least one signal tap, said signal tap supplying optical power to said signal detector.

6. The Raman fiber amplifier according to claim 1, having at least two pumps of one wavelength and at least two pumps of another wavelength.

7. The Raman fiber amplifier according to claim 6 wherein pump powers provided by said pumps are coupled together with a polarization multiplexer.

8. The Raman amplifier according to claim 1, wherein (i) said controller comprises an electrical sensor converting signal carrying optical power provided by a signal tap to an electrical signal, said controller utilizing said electrical signal to determine whether signal power level is below or above said predetermined range; and (ii) a pump driver that adjusts a drive current of said at least one pump to adjust the signal power level back to said predetermined signal range.

9. A method of controlling gain in a Raman amplifier comprising at least two optical pumps supplying power in wavelength $\lambda_i$, said method including the steps of:
   (i) for two pumps at one wavelength determining pump driving currents $C_i$ for each of said optical pumps so that the amount of power provided by the same wavelength pumps is about same;
   (ii) for two pumps at one wavelength determining the ratios of said driving currents with respect to one another;
   (iii) for two pumps at one wavelength driving the optical pumps with said pump driving currents, while maintaining said ratios;
   (iv) iteratively determining total pump powers $P_i$ to be provided in each of said pump wavelengths $\lambda_i$;
   (v) adjusting the driving currents $C_i$ proportionally, with respect to one another, to provide said pump powers $P_i$.

10. A method according to claim 9, further including the steps:
    (i) monitoring pump powers $P_i$ for power drop off; and
    (ii) if at least one of pump powers $P_i$ drops off, increasing the drive currents of the corresponding optical pumps, thereby maintaining gain spectrum of said distributed Raman fiber amplifier.

11. A method according to claim 9, further including the step of:
    (i) monitoring signal gain to determine whether said signal gain is below or above a predetermined gain range; and
    (ii) if said gain is outside a predetermined gain range re-scales all of said pump powers to provide gain that is within a predetermined gain range.

12. A Raman fiber amplifier comprising
    (i) a transmission fiber;
    (ii) at least one pump power detector;
    (iii) at least one pump optically coupled to said transmission fiber and to said pump power detector;
    (iv) at least one signal detector, optically coupled to said transmission fiber so as to detect signal power propagating through said transmission fiber;
    (v) a controller (a) operatively connected to said pump power detector and said signal detector, and (b) utilizing signals provided by said pump power detector and said signal detector, said controller adjusting the pump power provided by said at least one pump, so as to adjust gain provided by said Raman fiber amplifier or to keep the signal power level detected by said signal detector within a predetermined range;
    (vi) backscatter monitor, said backscatter monitor measuring amount of back-scattered pump signal and determining whether the amount of backscatter is within a predetermined range; and
    (vii) wherein said controller is connected to said at least one optical pump, said controller turning off said at least one optical pump when the amount of measured backscatter is outside a predetermined level.

13. The Raman amplifier of claim 12 wherein said backscatter monitor is a Rayleigh backscatter monitor.

14. The Raman amplifier of claim 13 wherein said Raman amplifier includes at least two pumps of different wavelengths, said Rayleigh backscatter monitor detects environmentally induced changes in the fiber attenuation.

15. The Raman amplifier of claim 13 wherein said Raman amplifier includes at least two pumps of different pump wavelengths, at least two pump power detectors and at least two Rayleigh backscatter monitors corresponding to each of these wavelengths, said Rayleigh backscatter monitors detecting change in a number of signal channels.

16. A Raman fiber amplifier comprising
   (i) a transmission fiber;
   (ii) at least three optical pumps of wavelengths $\lambda_1, \lambda_2, \lambda_3$, optically coupled to said transmission fiber;
   (iii) at least one pump power detector associated with each of said optical pumps;
   (iv) at least one signal detector, optically coupled to said transmission fiber so as to detect signal power propagating through said transmission fiber;
   (v) a controller (a) operatively connected to said pump power detectors and said signal detector, and (b) utilizing signals provided by said pump power detectors and said signal detector, said controller adjusting the pump power provided by said at least one pump, so as to adjust gain provided by said Raman fiber amplifier or to keep the signal power level detected by said signal detector within a predetermined range;
   (vi) at least one backscatter monitor measuring the amount of backscattered pump signal and providing input about the amount of measured backscatter to said controller, wherein said controller adjusts pump power of at least one pump when the amount of measured backscatter is outside a predetermined level, wherein said Raman fiber amplifier is a distributed fiber amplifier that includes, as its gain medium, more than 5 km of single mode transmission fiber.

17. The Raman fiber amplifier according to claim 16, wherein said Raman fiber amplifier includes, as its gain medium, more than 50 km of single-mode transmission fiber.

18. The Raman fiber amplifier according to claim 16, wherein said Raman fiber amplifier includes, as its gain medium, more than 80 km of single-mode transmission fiber.

19. The Raman amplifier according to claim 16, wherein said controller adjusts pump power provided by said at least one of said three optical pumps to maintain constant signal gain level provided by said Raman amplifier.

20. The Raman amplifier according to claim 16, wherein said controller adjusts the pump power provided by said at least one said three optical pumps to maintain a constant output signal level provided by said Raman amplifier.

* * * * *